(12) United States Patent
Chang

(10) Patent No.: US 10,391,441 B2
(45) Date of Patent: Aug. 27, 2019

(54) STRUCTURAL STRENGTH ENHANCED ROTOR AND FLUID PROCESSING APPARATUS

(71) Applicants: JG ENVIRONMENTAL TECHNOLOGY CO., LTD., Taoyuan OT (TW); Feng-Tang Chang, Taoyuan (TW)

(72) Inventor: Feng-Tang Chang, Taoyuan (TW)

(73) Assignee: JG Environmental Technology Co., Ltd., Taoyuan (TW)

( * ) Notice: Subject to any disclaimer, the term of this patent is extended or adjusted under 35 U.S.C. 154(b) by 127 days.

(21) Appl. No.: 15/821,509

(22) Filed: Nov. 22, 2017

(65) Prior Publication Data

US 2018/0140992 A1 May 24, 2018

(30) Foreign Application Priority Data

Nov. 22, 2016 (TW) .............................. 105138320 A

(51) Int. Cl.
*B01D 53/06* (2006.01)
*B01D 53/00* (2006.01)

(52) U.S. Cl.
CPC ............ *B01D 53/06* (2013.01); *B01D 53/002* (2013.01); *B01D 2253/102* (2013.01); *B01D 2253/104* (2013.01); *B01D 2253/108* (2013.01); *B01D 2253/116* (2013.01); *B01D 2253/202* (2013.01); *B01D 2253/3425* (2013.01);
(Continued)

(58) Field of Classification Search
CPC ................. B01D 53/002; B01D 53/06; B01D 2253/102; B01D 2253/104; B01D 2253/106; B01D 2253/108; B01D 2253/116; B01D 2253/202; B01D 2253/3425; B01D 2257/708; B01D 2258/06; B01D 2259/4009; F24F 3/1423
USPC ...................... 95/113; 96/125, 131, 132, 154
See application file for complete search history.

(56) References Cited

U.S. PATENT DOCUMENTS 3,907,310 A * 9/1975 Dufour ................ F16J 15/3452
165/9
5,595,238 A 1/1997 Mark et al.
5,771,707 A 6/1998 Legace et al.
(Continued)

FOREIGN PATENT DOCUMENTS

CN 1104319 A 6/1995
CN 2794615 Y 7/2006
(Continued)

*Primary Examiner* — Frank M Lawrence, Jr.
(74) *Attorney, Agent, or Firm* — Muncy, Geissler, Olds & Lowe, P.C.

(57) ABSTRACT

A rotor includes a hub, a frame, several processing elements and several plates. There are ribs and slots formed between the frame and the processing elements, in which the ribs are engaged with the slots. Therefore, the ribs provide axial support and thus enhance the structural strength of the processing elements. In addition, the processing elements may include two layers of fiber substrates with different structural strength, so that the rotor can meet the requirements of both the structural strength and the processing efficiency by the combination of different substrates. Furthermore, there can be a perforated plate disposed on the frame for the processing elements to abut thereagainst. The rotor can thus have enhanced structural strength.

8 Claims, 7 Drawing Sheets

(52) U.S. Cl.
CPC .... *B01D 2257/708* (2013.01); *B01D 2258/06* (2013.01); *B01D 2259/4009* (2013.01)

(56) References Cited

U.S. PATENT DOCUMENTS

| | | | |
|---|---|---|---|
| 8,876,957 B2* | 11/2014 | Fujioka | B01D 53/06 96/125 |
| 2009/0126898 A1 | 5/2009 | Eplee et al. | |
| 2014/0014289 A1 | 1/2014 | Tan | |

FOREIGN PATENT DOCUMENTS

| | | |
|---|---|---|
| TW | 536422 B | 6/2003 |
| TW | 201632245 A | 9/2016 |

\* cited by examiner

STRUCTURAL STRENGTH ENHANCED ROTOR AND FLUID PROCESSING APPARATUS

BACKGROUND OF THE INVENTION

Field of the Invention

The present invention relates generally to a fluid processing apparatus and its rotor, and more particularly to a structural strength enhanced rotor.

Description of the Prior Art

Rotors are common fluid processing apparatus. Primary parts of a rotor includes fiber substrates and processing agent powders attached on the fiber substrates. The processing agent powders have the ability to remove, modify or change the physical properties of contents within fluid to be processed. The fiber substrates function as a structural part to support the powders.

Taking a honeycomb zeolite rotor as an example, it is generally manufactured in the following steps: coating fiber papers with adhesive, transforming the fiber papers into a honeycomb construction by special forming rollers, rolling the honeycomb fiber papers or stacking the honeycomb fiber papers into a cuboid shape, sintering at 400-500° C. for several hours to evaporate substantially all the organic materials in the honeycomb construction, impregnating and wash coating the sintered inorganic substrate with zeolite processing agent powders, and then drying the substrate at 70-250° C.

Currently, ceramic fibers are commonly used as the fiber substrates of the rotor. The ceramic fibers have better structural strength. Nevertheless, ceramic fibers are heavy and thus have lower processing agent powder carriage efficiency, i.e. the weight of processing agent powders carried per unit weight of the fiber substrates. As a result, the rotor is inevitably heavier in order to acquire sufficient fluid processing ability, in which its weight is mainly contributed by the ceramic fibers. This fact further leads to several defects. First, the rotor casing must be able to carry heavier weight. Besides, the ceramic fibers are heavy and can absorb more heat during the desorption process, which lowers the treatment temperature in the desorption zone and thus lowers the desorption efficiency of the processing agent.

Glass fibers are also common fiber substrates. Different from the ceramic fibers, the glass fibers have lighter weight. The processing agent powder carriage efficiency of the glass fibers is thus significantly higher than that of the ceramic fibers. Substrates made of glass fibers absorb less heat during the desorption process such that the treatment temperature can be maintained and the desorption efficiency can be increased. On the other hand, the glass fibers have weaker structural strength than the ceramic fibers. Gaps and cracks sometimes occurs between the glass fiber substrates and the frame of the rotor when the rotor is applied with high wind pressure.

Therefore, it is of concern to the person skilled in this art to increase the processing agent powder carriage efficiency and maintain structural strength as well.

SUMMARY OF THE INVENTION

One object of the present invention is to provide a rotor having better structural strength.

To achieve the above and other objects, the present invention provides a rotor having an inlet side and an outlet side along its axial direction. The rotor is adapted for fluid to flow between the inlet side and the outlet side. The rotor includes a hub assembly rotatable about an axis, a frame, a plurality of processing elements and a plurality of plates. The frame is disposed on the hub assembly, and the frame is formed with several axial processing channels each defined by several walls. At least one of the walls has at least one ribs radially protruded into one of the processing channels. Each of the processing elements includes fiber substrates and processing agent powders attached on the fiber substrates. Each of the processing elements is filled in one of the processing channels. Each of the processing elements has several element surfaces corresponding to the walls respectively. At least one of the element surfaces has at least one radially recessed slot which divides the element surface into several areas. The slot is substantially complementary to the rib protruded into the processing channel for the rib to engage therewith. The plates are disposed on the areas divided by the slot, respectively. Each of the plates is located between the corresponding element surface and the wall. Thereby, the rib can support the processing element in the axial direction and thus increase the structural strength of the rotor.

To achieve the above and other objects, the rib is perforated or has a honeycomb structure which allows fluid to pass therethrough and help maintain the effective axial flow processing area of the processing elements.

To achieve the above and other objects, the present invention provides a rotor having an inlet side and an outlet side along its axial direction. The rotor is adapted for fluid to flow between the inlet side and the outlet side. The rotor includes a hub assembly rotatable about an axis, a frame, a plurality of processing elements and at least one perforated plate. The frame is formed with several axial processing channels. Each of the processing elements includes fiber substrates and processing agent powders attached on the fiber substrates. Each of the processing elements is filled in one of the processing channels. The perforated plate is disposed on the frame and corresponding to the processing channels. The perforated plate is located on the inlet side or the outlet side of the rotor for the processing elements to abut thereagainst. Thereby, the perforated plate can support the processing elements in the axial direction and thus increase the structural strength of the rotor.

To achieve the above and other objects, the present invention provides a rotor having an inlet side and an outlet side along its axial direction. The rotor is adapted for fluid to flow between the inlet side and the outlet side. The rotor includes a hub assembly rotatable about an axis, a frame and a plurality of processing elements. The frame is formed with several axial processing channels. Each of the processing elements includes a first fiber substrate, a second fiber substrate and processing agent powders attached on the first and the second fiber substrates. The first fiber substrate is closer to the inlet side than the second fiber substrate. One of the first and the second fiber substrates has better structural strength than the other of the first and the second fiber substrates. Each of the processing elements is filled in one of the processing channels. The structural strength and the processing efficiency of the rotor can be balanced through the combination of different fiber substrates.

DETAILED DESCRIPTION OF THE PREFERRED EMBODIMENTS

Figure 1:
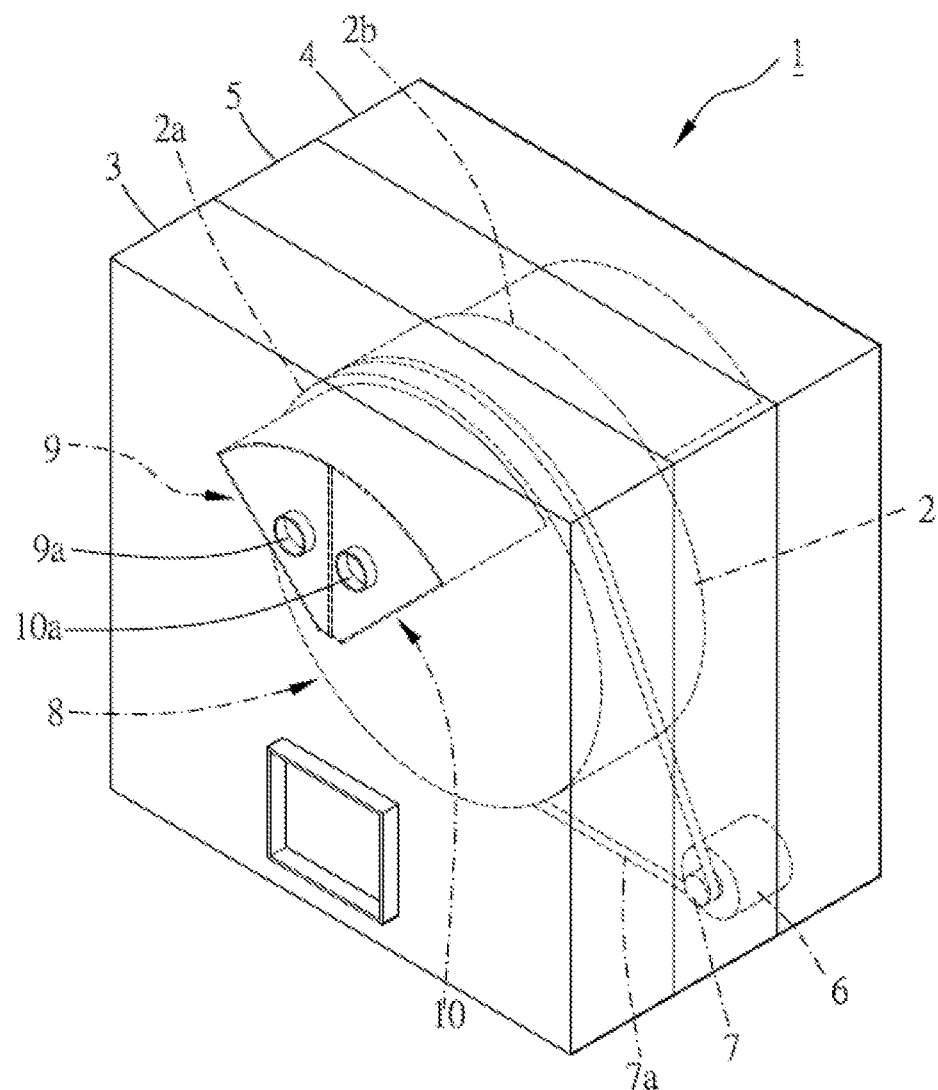
FIG. 1 is a perspective view of a fluid processing apparatus in accordance with the first embodiment.

Please refer to FIG. 1 for a fluid processing apparatus in accordance with the first embodiment. The fluid processing apparatus 1 is adapted to process fluid such as gas or liquid. The aforesaid "process" includes but not limited to remove, modify or change the physical properties of contents within the liquid or the gas. The fluid processing apparatus 1 has a rotor 2, an inlet casing 3, an outlet casing 4, a box-shaped casing 5 and a driving means. The rotor 2 has an inlet side 2a and an outlet side 2b, and the rotor 2 is rotatably disposed in the box-shaped casing 5. The inlet casing 3 is disposed in the inlet side 2a of the rotor 2, while the outlet casing 4 is disposed in the outlet side 2b of the rotor 2. The inlet casing 3 and the outlet casing 4 can define several fluid channel subject to conditions. The fluid processing apparatus 1 is adapted for at least a part of the fluid to flow into the rotor 2 via the inlet casing 3 and then to be expelled from the outlet casing 4. In some other possible embodiments, the fluid processing apparatus 1 can also be adapted for at least a part of the fluid to flow into the rotor 2 via the outlet casing 4 and then to be expelled from the inlet casing 3. In some other possible embodiments, the fluid processing apparatus 1 can also be adapted for at least a part of the fluid to flow sequentially through the inlet casing 3/the outlet casing 4, the rotor 2 and the outlet casing 4/the inlet casing 3, and then to flow back to the rotor 2 and be expelled from the inlet casing 3/the outlet casing 4.

The driving means is adapted to drive the rotor 2 to rotate relative to the box-shaped casing 5. The rotation can be but not limited to continuous rotation, intermittent rotation or stepper rotation. The power to drive the rotor 2 can be but not limited to a motor 6. Transmission units can be disposed between the motor 6 and the rotor 2 to transmit the power, change the power direction and/or change the rotating speed. The transmission units can be but not limited to reducers, gears, chains, belts, cranks, rocker arms or combinations thereof. In the present embodiment, the transmission units include a reducer 7 and a chain 7a installed between the output gear of the reducer 7 and the rotor 2.

In the present embodiment, the fluid processing apparatus 1 is a honeycomb zeolite rotor condenser for air purification, which is an adsorption-regeneration condenser. The rotor condenser includes an adsorption zone 8, a regeneration zone 9 and a purge zone 10. Zeolite is the primary processing material having processing activity in the fluid processing apparatus 1. Honeycomb is the shape of the fluid channel in the rotor 2. Condensation is the primary effect the apparatus can achieve. Taking VOCs-containing air as an example, the air is fed into the adsorption zone 8, in which the VOCs are adsorbed by the zeolite. The processed air is then expelled from the outlet casing 4. Regeneration air is fed into the purge zone 10 of the rotor 2 via a regeneration air inlet 10a of the inlet casing 3 and then exchange heat with the zeolite, in which the purge zone 10 also works as a buffer between the adsorption zone 8 and the regeneration zone 9. An optional heater such as a heat exchangeable incinerator or a heat exchangeable boiler can be used to further heat up the regeneration air to the adequate regeneration temperature. The heated regeneration air is then fed into the regeneration zone 9 of the rotor 2 to extract the VOCs from the zeolite. The regeneration air can be then expelled from a regeneration air outlet 10b of the inlet casing 3. The VOC concentration of the regeneration air is normally significantly higher than that of the air to be processed, and thus the condensation effect can be achieved. It is to be noted that the fluid processing apparatus suitable in the present invention is not limited to the honeycomb zeolite rotor condenser. Other fluid processing apparatus suitable in the present invention includes but not limited to adsorption-regeneration rotor, rotor catalytic converter, rotor exchanger such as heat exchanger and ion exchanger. Processing material suitable in the present invention includes but not limited to zeolite, active charcoal, polymer resin, carbon molecular sieve, porous adsorption material and the combination thereof.

Figure 2:
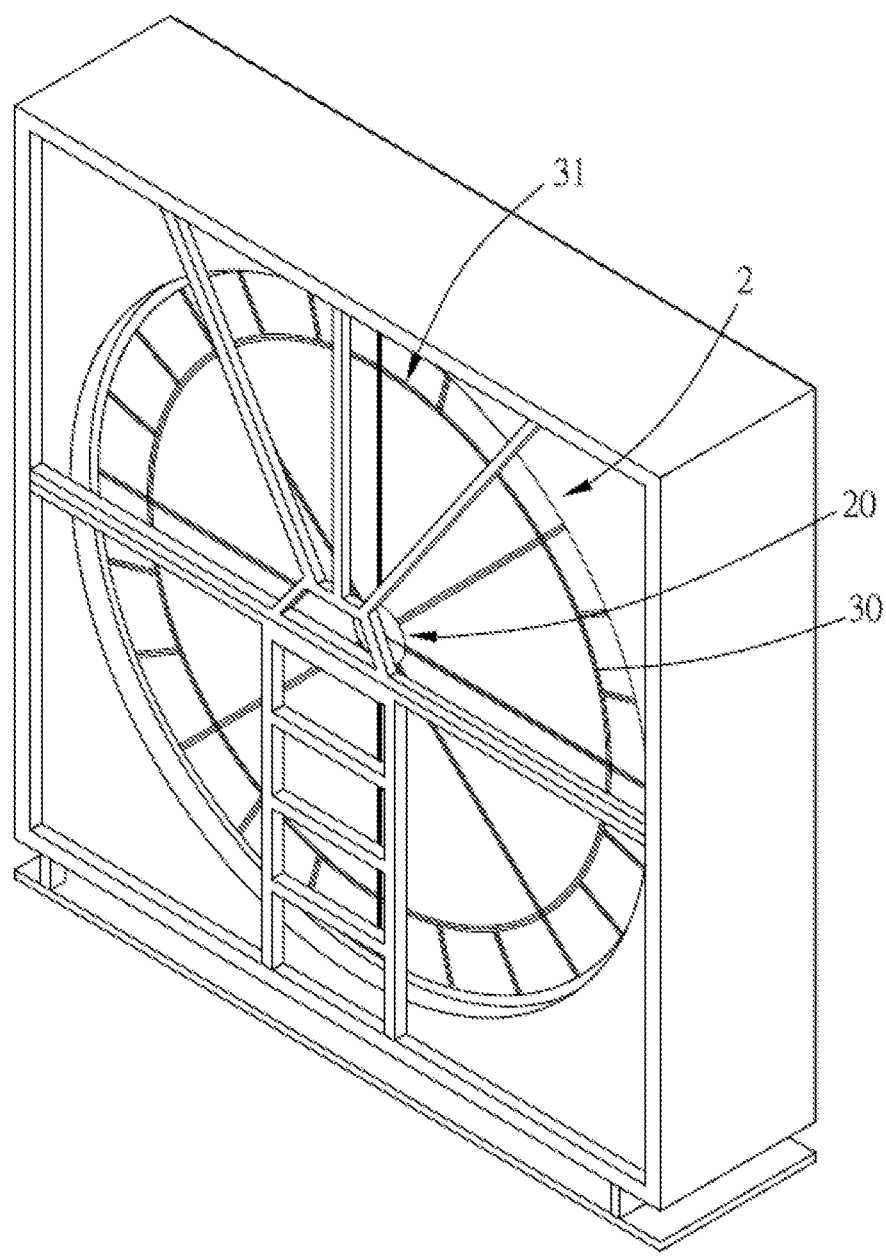
FIG. 2 is a perspective view of the rotor in accordance with the first embodiment.
Figure 3:
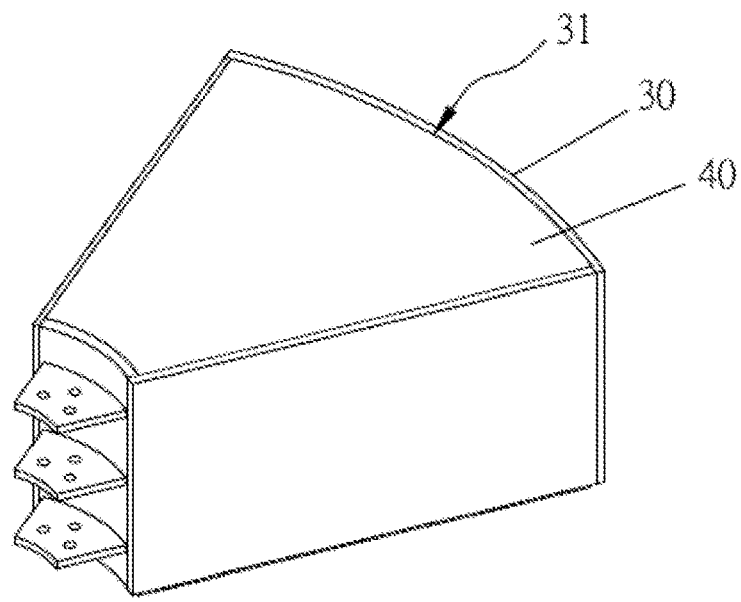
FIG. 3 is a perspective view of a part of the rotor in accordance with the first embodiment, in which one of the processing elements and other parts surrounding the processing element are shown.

Please refer to FIG. 2 for the rotor in accordance with the first embodiment. The rotor 2 is adapted for fluid such as air or liquid to flow between the inlet side and the outlet side thereof. Said 'flow between the inlet side and the outlet side' can be referred to but not limited to directly flow from the inlet side to the outlet side, directly flow from the outlet side to the inlet side, flow into the rotor via the inlet side and exit the rotor via other openings on the inlet side, and flow into the rotor via the outlet side and exit the rotor via other openings on the outlet side. The fluid normally flow within the rotor in the axial direction. In some possible applications, the fluid can flow within the rotor in the radial direction or in directions other than the axial direction.

Please refer to FIGS. 2 to 5. In the present embodiment, the rotor 2 includes a hub assembly 20 rotatable about an axis, a frame 30, a plurality of processing elements 40 and a plurality of plates 50.

The hub assembly 20 has a shaft and a hub disposed on and synchronously rotatable with the shaft. In other possible embodiments, the hub assembly can also be a shaft pipe rotatably disposed on a shaft. The hub assembly 20 is rotatable about ether a virtual axis or a substantial shaft.

Figure 4:
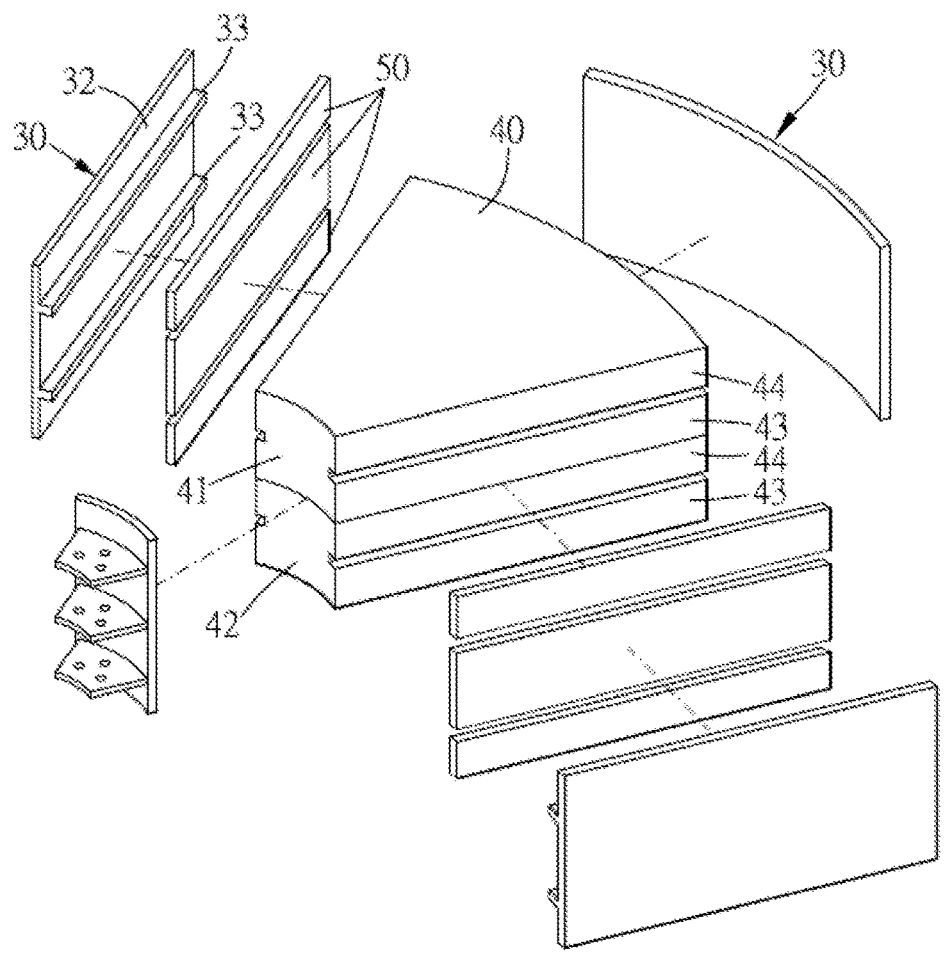
FIG. 4 is an explosive drawing of a part of the rotor in accordance with the first embodiment, in which one of the processing elements and other parts surrounding the processing element are shown.
Figure 5:
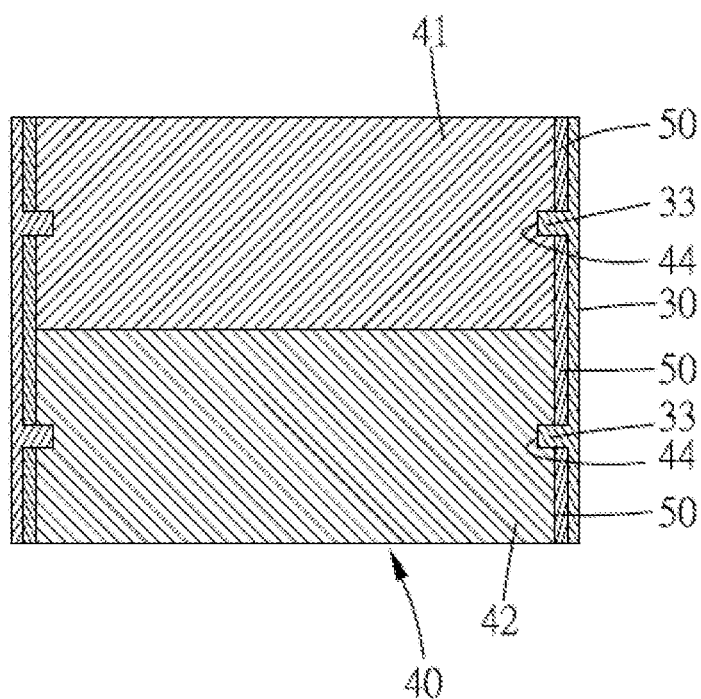
FIG. 5 is a profile showing a part of the rotor in accordance with the first embodiment, in which one of the processing elements and other parts surrounding the processing element are shown.

The frame 30 is disposed on the hub assembly 20. In the present embodiment, the hub assembly 20 is located right at the geometric center of the frame 30 and supports the frame 30. In the present embodiment, the frame 30 has a substantially wheel-like contour, and the frame 30 is formed with several axial processing channels 31. The processing channels 31 in the inner circle are sector-shaped and adjacent to the hub assembly 20. The processing channels 31 in the outer circle are substantially trapezoid-shaped and located around the sector-shaped processing channels 31. These processing channels 31 are defined by walls 32 and are open to the inlet side and the outlet side. As shown in FIG. 4, the walls 32 on two radial sides of the sector-shaped processing channels each has two ribs 33 radially protruded into the corresponding processing channel 31. It is to be noted that the contour of the processing channels can be varied subject to conditions.

The processing elements 40 each includes fiber substrates and processing agent powders attached on the fiber substrates. The fiber substrates can be but not limited to ceramic fibers or glass fibers. The processing agent powder is made of processing material(s) which has processing activity to the target fluid content(s). The processing material(s) can remove, modify or change the physical properties, such as temperature, of a part of or all the target fluid content(s). The processing material(s) may vary subject to the target fluid contents and the effect to be required, and the processing material(s) can be but not limited to catalyst, zeolite, active charcoal, polymer resin, carbon molecular sieve, porous adsorption material and the combination thereof. Taking the porous adsorption material as an example, the processing material(s) can be hydrophilic or hydrophobic zeolite, active charcoal, active aluminium oxides, silicone or the combination thereof. The hydrophilic zeolite, for instance, can be A-type, 13X-type or low silica-alumina ratio Y-type zeolite. The hydrophobic zeolite, on the other hand, can be ZSM-5-type, MCM-type or high silica-alumina ratio Y-type zeolite. The MCM-type zeolite can be M41S-group zeolites such as hexagonal MCM-41, cubic MCM-48 or lamellar MCM-50 zeolites. These zeolites can be purchased from Nankai University Catalyst Co., Ltd., for example.

In the present embodiment, the processing elements 40 each includes two layers of substrate fibers, i.e. the first fiber substrate 41 and the second fiber substrate 42. The first fiber substrate 41 is right adjacent to the inlet side, while the second fiber substrate 42 is right adjacent to the outlet side. The first and the second fiber substrates 41 and 42 can have different structural strength. For instance, the first fiber substrate 41 can be made of glass fibers, while the second fiber substrate 42 can be made of ceramic fibers whose structural strength are higher than the glass fibers. Because the second fiber substrate 42, located at the downstream of the processing channel, has higher structural strength, the second fiber substrate 42 is able to support the whole processing element even when the working wind pressure is high. The processing element is thus less likely to crack.

In the present embodiment, the processing elements 40 each has six element surfaces 43, four of which are corresponding to the walls 32 of the frame 30 respectively. The rest two of the element surfaces 43 face toward the inlet side and the outlet side respectively. The element surfaces 43 located on two lateral sides of the processing element 40 each has two radially recessed slots 44 which divide the corresponding element surface 43 into three areas, in which one of the slots 44 is formed on the first fiber substrate 41 and the other of the slots 44 is formed on the second fiber substrate 42. The slots 44 are formed between but not right adjacent to the inlet side and the outlet side. The ribs 31 protruded into the processing channel 31 are substantially complementary to the slots 44, respectively. When the processing element 40 is installed, the ribs 31 engage with the slots 44 respectively and can axially support the processing element 40.

To maintain the effective axial flow processing area of the processing elements 40, the ribs 33 can be made perforated or have a honeycomb structure which allows fluid to pass therethrough.

Because the fiber substrates are normally hard and brittle, the plates 50 can be installed between the element surfaces 43 and the walls 32 to prevent the processing elements 40 from collision and damage. Though the plates 50 be formed into different shapes, the plates 50 can be respectively corresponding and having similar contour to the aforementioned areas on the element surfaces 43. In possible embodiments, the plates 50 can be attached to the areas on the element surfaces 43 by silicone or other adhesives. Adjacent plates 50 are separated by one of the slots 44, such that the rib 33 can be inserted into the slot 44 between the plates 50.

Figure 6:
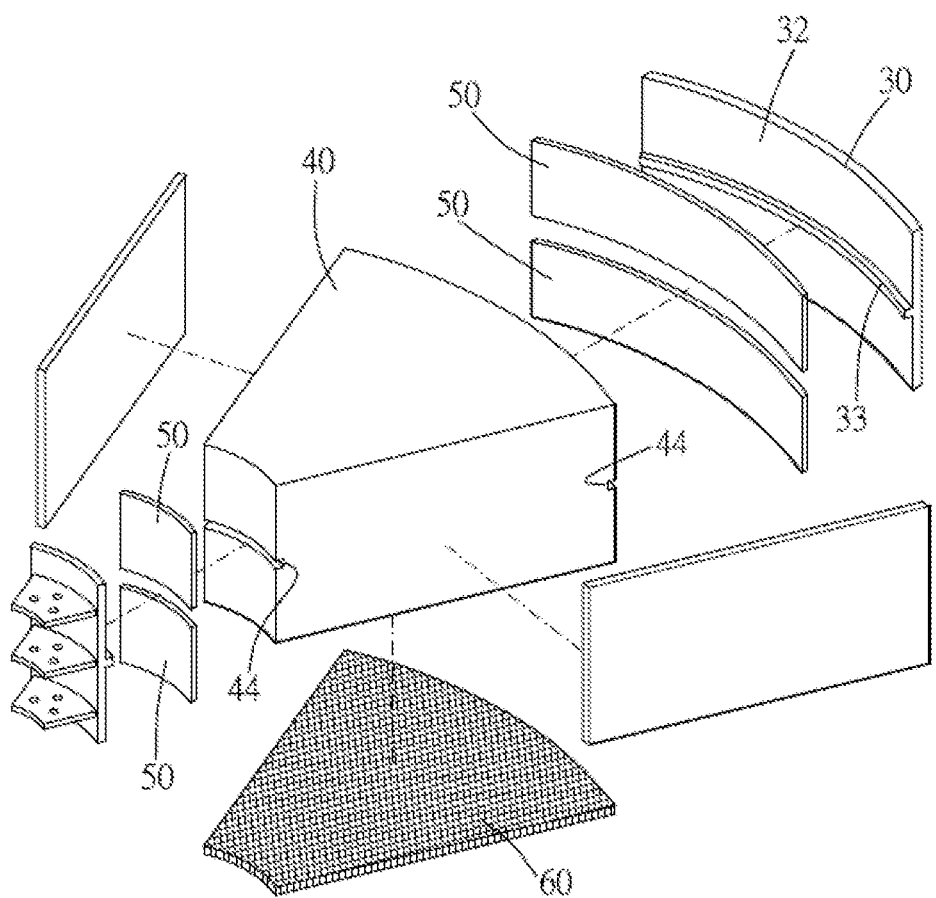
FIG. 6 is an explosive drawing of a part of the rotor in accordance with the second embodiment, in which one of the processing elements and other parts surrounding the processing element are shown.

In the above-mentioned embodiment, the processing elements each has two different fiber substrates. In the embodiment as shown in FIG. 6, the processing element 40 utilizes only one type of fiber substrates. The processing element 40 is formed with slots 44 not on its lateral sides but on its longitudinal sides, each of which are attached with two plates 50 beside the slot 44. The walls 32 corresponding to the longitudinal sides of the processing element 40 are formed with ribs 33 engageable with the slots 44 and providing axial support. The plates 50 are then clamped between the processing element 40 and the frame 30. In other possible embodiments, the processing element can be formed with slots on all the lateral and longitudinal sides, and the walls surrounding the processing element are all formed with ribs to further r enhance the structural strength of the rotor. In addition, the rotor of the present embodiment further includes a perforated plate 60 disposed on the outlet side of the frame 30 for the processing element 40 to abut thereagainst, in which the perforated plate 60 can help the processing element resist the working wind pressure. In other possible embodiments, the perforated plate can be disposed on the inlet side of the frame to resist the wind pressure from the other side. In other possible embodiments, one large perforated plate can be used to support multiple processing element.

Figure 7:
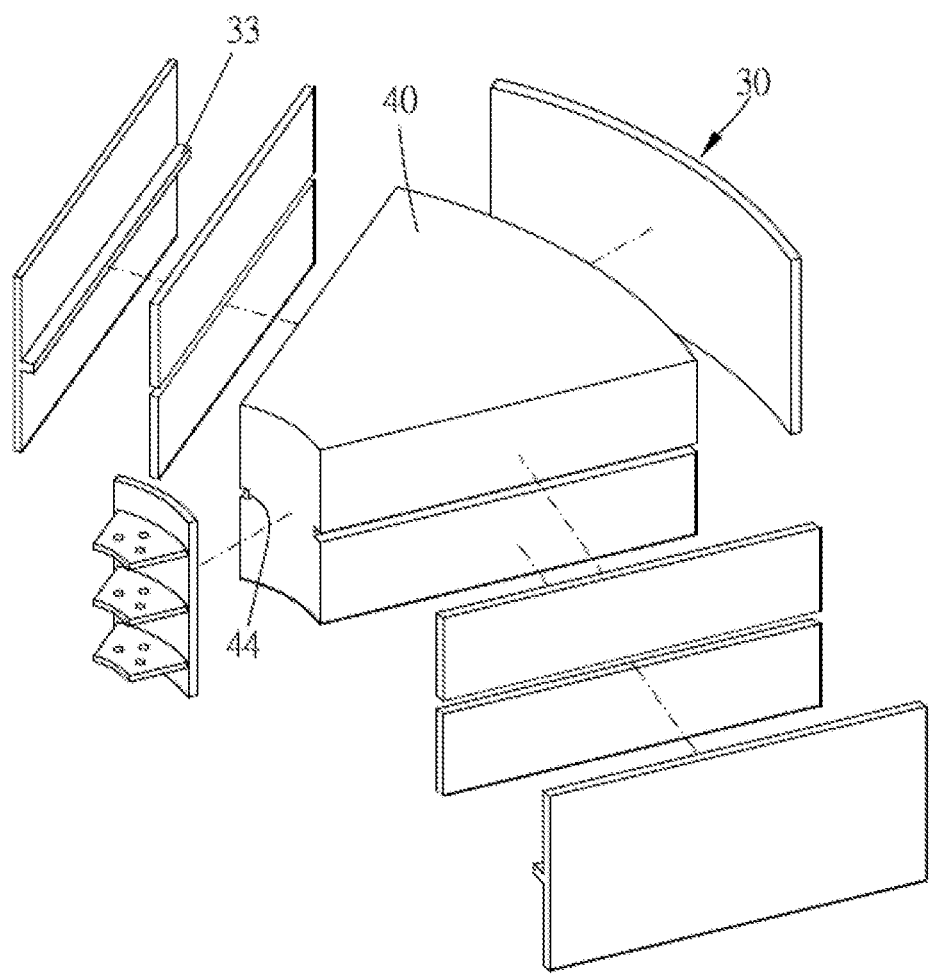
FIG. 7 is an explosive drawing of a part of the rotor in accordance with the third embodiment, in which one of the processing elements and other parts surrounding the processing element are shown.

Please refer to FIG. 7 for another embodiment. The processing element 40 of the present embodiment has only one type of fiber substrates. The structure strength of the rotor is also enhanced with the help of the engagement of the ribs 33 and the slots 44.

Figure 8:
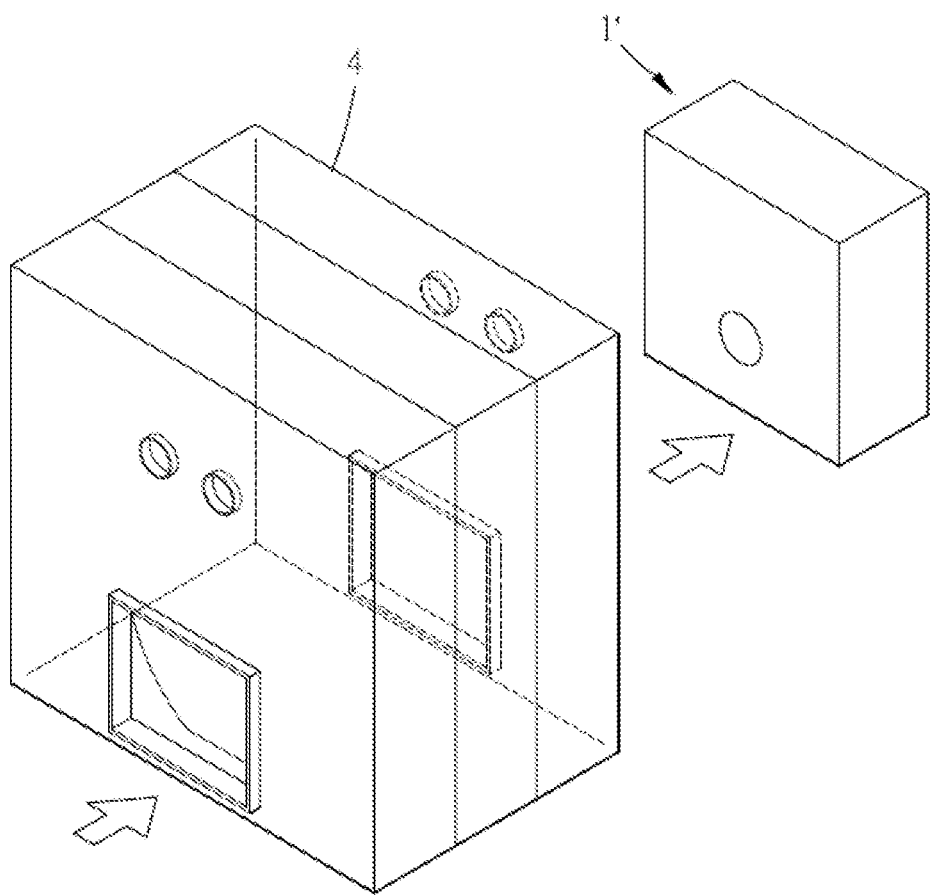
FIG. 8 is a perspective view of a fluid processing apparatus in accordance with the second embodiment.

Please refer to FIG. 8. In another embodiment of the fluid processing apparatus, a rear processing device 1' is further provided. The rear processing device 1' can further process the fluid expelled from the outlet casing 4. The rear processing device 1' can be but not limited to an incinerator such as a fuel incinerator or a catalyst incinerator, a condenser or a fluidized bed adsorption-regeneration device. The heat generated from the incinerator can be used to heat up the regeneration air utilized in the regeneration zone.

What is claimed is:

1. A structural strength enhanced rotor, having an inlet side and an outlet side along its axial direction, the rotor being adapted for fluid to flow between the inlet side and the outlet side, the rotor comprising:
   a hub assembly rotatable about an axis;
   a frame disposed on the hub assembly, the frame being formed with several axial processing channels each defined by several walls, at least one of the walls having at least one ribs radially protruded into one of the processing channels;

a plurality of processing elements, each comprising fiber substrates and processing agent powders attached on the fiber substrates, each of the processing elements being filled in one of the processing channels, each of the processing elements having several element surfaces corresponding to the walls respectively, at least one of the element surfaces having at least one radially recessed slot which divides the element surface into several areas, the slot being substantially complementary to the rib protruded into the processing channel for the rib to engage therewith; and a plurality of plates, respectively disposed on the areas divided by the slot, each of the plates being located between the corresponding element surface and the wall.

2. The rotor of claim 1, further comprising at least one perforated plate disposed on the frame and corresponding to the processing channels, the perforated plate being located on the inlet side or the outlet side of the rotor for the processing elements to abut thereagainst.

3. The rotor of claim 1, wherein the fiber substrates comprise a first fiber substrate and a second fiber substrate, the first fiber substrate is closer to the inlet side than the second fiber substrate, one of the first and second fiber substrates has better structural strength than the other of the first and second fiber substrates.

4. The rotor of claim 3, wherein at least one of the element surfaces has two said radially recessed slots which divide the element surface into three areas, one of the slots is formed on the first fiber substrate, the other of the slots is formed on the second fiber substrate.

5. The rotor of claim 3, wherein the first fiber substrate is substantially made of glass fibers, the second fiber substrate is substantially made of ceramic fibers, the first fiber substrate is right adjacent to the inlet side, the second fiber substrate is right adjacent to the outlet side.

6. The rotor of claim 1, wherein the rib is perforated or has a honeycomb structure.

7. A fluid processing apparatus, comprising:
a box-shaped casing;
a rotor as defined in claim 1, wherein the rotor is rotatably disposed in the box-shaped casing;
a driving means for driving the rotor to rotate relative to the box-shaped casing;
an inlet casing, disposed on the inlet side of the rotor; and
an outlet casing, disposed on the outlet side of the rotor, the fluid processing apparatus being adapted for at least a part of the fluid to flow into the rotor via the inlet casing and to be expelled from the outlet casing.

8. The fluid processing apparatus of claim 7, wherein the fluid processing apparatus is an adsorption condenser adapted for air purification, the fluid processing apparatus comprises an adsorption zone, a regeneration zone and a purge zone.

* * * * *